Dec. 28, 1954     A. W. REYNOLDS     2,697,877
GRASS AND WEED CUTTER
Filed Sept. 25, 1951
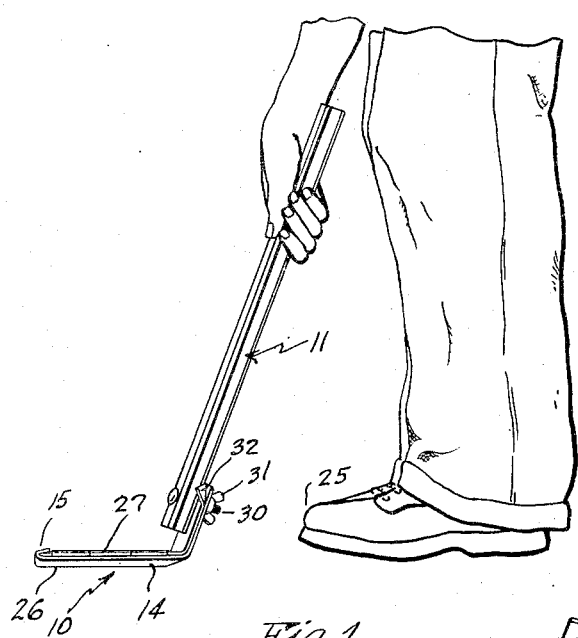
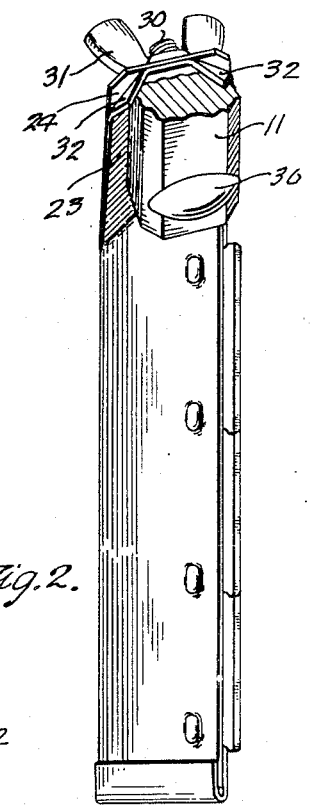
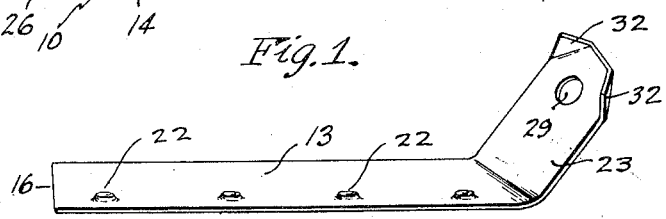
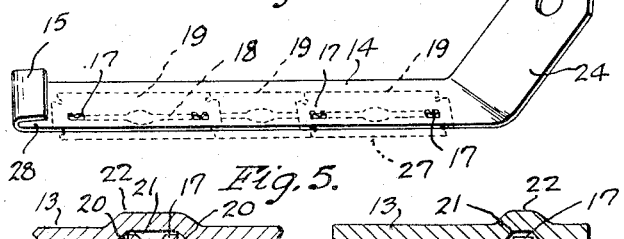
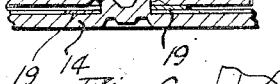
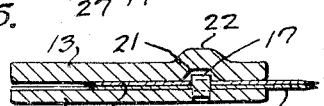
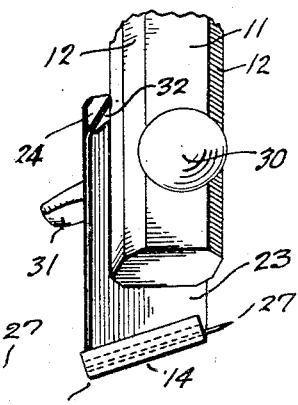
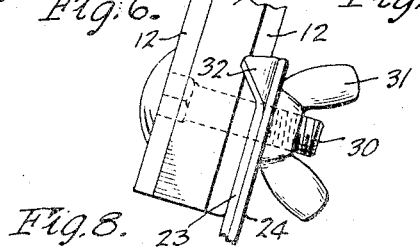
Inventor
Arthur W. Reynolds
By Wooster & Davis Attorneys United States Patent Office 2,697,877
Patented Dec. 28, 1954

2,697,877

GRASS AND WEED CUTTER

Arthur W. Reynolds, Newtown, Conn.

Application September 25, 1951, Serial No. 248,136

1 Claim. (Cl. 30—318)

This invention relates to a grass and weed cutter, and has for an object to provide an effective cutter for grass and small weeds which is simple in construction and reasonable in price, and particularly such a cutter for use in limited spaces around shrubs and bushes, around trees, along walks and driveways, foundations, walls and edges of flower-beds, and the like, which the lawnmower misses or cannot reach.

It is also an object to provide such a device in which old or new razor blades, particularly double-edged blades, may be used, to furnish a keen cutting edge that does not require re-sharpening, which are cheap and easy to obtain and may be quickly replaced, or reversed with the double-edged type to use the other edge, if one should be chipped or broken on some hard object such as a stone, for example.

It is a further object to so arrange the cutting edge that chipping or breaking of this edge rarely happens because it is raised above the ground.

A still further object is to provide a simple construction in which the blades may be easily replaced or reversed by the simple removal of a single wingnut, and then tightened in place by means of this nut.

Another object is to provide a device which may be used in one hand by merely swinging it back and forth similar to the motion of a pendulum, in short quick strokes for the cutting operation, and in which one edge acts on the back stroke with a tendency to straighten up bent grass and so forth, so that it may be cut on the next forward stroke.

With the foregoing and other objects in view, I have devised the construction and arrangement illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side view illustrating the preferred method of use of the device;

Fig. 2 is a top plan view on a larger scale and with a part of the handle broken away;

Fig. 3 is an end view looking toward the bottom of Fig. 2;

Fig. 4 is a perspective view of the top blade-holding element;

Fig. 5 is a similar view of the bottom blade-holding element;

Fig. 6 is a transverse detail section of a portion of the holder and blade;

Fig. 7 is a similar view at right angles to Fig. 6, and

Fig. 8 is a detail side view showing the securing means.

Common types of grass trimming shears or cutters have pivoted blades arranged for shearing action by back and forth relative movements of the blades, usually against the action of springs which return them to the open position when pressure is released, and they may be operated with short handles similar to sheep shears which require the operator to lean over or kneel, or some are operated with long handles permitting the operator to use them in the standing position, but such shears are very fatiguing to the hands or fingers in operation, and they also are not always effective in cutting weeds and grass. The present device has no such shearing blades movable relative to each other for the shearing operation, but has a single cutting edge which may be swung rapidly back and forth for the cutting operation, and has been found to be very effective, much less tiring in use and permitting much more rapid trimming of grass and weeds in restricted spaces.

It comprises a cutter 10 and a handle 11, the handle preferably being of wood or similar material, and is also preferably substantially rectangular in cross section so as to provide a better grip and not turn in the hand, but it is also preferred to bevel off the corners, as indicated at 12. The cutter 10 comprises upper and lower holders or plates 13 and 14. The lower plate comprises a strip of metal of the desired width, preferably about one inch wide, and it has been found that the preferred length of the cutter is about five inches, although it may be varied as found desirable. The handle may also be of any length found desirable, but it is preferably about twenty-two inches long, so that when used by the operator as shown in Fig. 1 it can be swung back and forth by one hand while the user is stooping over somewhat to get a better view of the material being cut. The lower holder or plate 14 is folded over on itself at its outer free end 15 to form a seat 28 for the free end 16 of the top plate or holder 13, and the plate 14 is provided with upwardly pressed holding lugs 17 properly spaced to enter the opposite ends of the slots 18 of the standard type double-edged razor blade 19. These may be spaced so that adjacent blades overlap at their opposite ends as shown on the drawing in Figs. 5 and 6. This forms a continuous cutting edge and the overlap of the blades strengthens this edge. These lugs 17 are formed with straight right-angled opposite ends 20 so as to provide a straight shoulder for engaging the ends of the slots in the blades and facilitate holding of the blades both in use when clamped in the holder and also prevent their being displaced when the blades are being replaced or reversed.

The top plate or holder 13 has recesses 21 in alignment with and over the lugs 17 to cover up the lugs and hold the plates 13 and 14 in alignment when clamped together and prevent lateral movement of the top plate. These recesses are formed by pressing them into the plate 13, forming a rounded bump 22 which does not catch on any grass or weeds being cut or interfere with the cutting operation. The inner ends of the plates or strips 13 and 14 are bent upwardly at an inclined angle, as shown at 23 and 24, and it is preferred that they be bent so that the handle 11 slopes or inclines backwardly at an angle of about twenty degrees to the vertical as shown in Fig. 1. The handle is substantially in alignment with the cutter or in substantially the plane of this cutter. It is found that this angle of the handle permits the cutter to be swung back and forth with the bottom edge of the blade-holder 10 level with the ground when the rear end of this cutter is about six inches in front of the operator's toes 25. This is the position in which it has been found that it swings more naturally; it is less tiring to the operator, and cuts more efficiently than when the blade is held farther away.

The ends 23 and 24 are also twisted or inclined somewhat to the longitudinal axis of the plates or holders 13 and 14 so that when the handle is held in the upright position these plates and holders together with the cutting blades 19 are inclined forwardly and upwardly as shown in Fig. 3, and although this angle may be varied it is preferably about 25° to the horizontal, as this has been found very effective in that the cutting edge swings through the grass and weeds at an angle, similar to the effect of a scythe, instead of straight across or at right angles to the stems and leaves. This has an easier and more effective cutting effect, and furthermore, as the rear edge 26 is below the forward cutting edge 27 of the blade this cutting edge is protected against hitting against the ground or a hard object such, for example, as stones and the like, as this edge 26 will hit these objects instead of the cutting edge.

In mounting the razor blades 19 in the cutter, they are placed on the top of the lower plate or holder 14 as shown in Fig. 5, with the lugs 17 in the opposite ends of the slots in these blades. Then the upper holder or plate 13 is placed on top of these blades by inserting its free end 16 in the recess 28 under the folded-over end 15, and the body portion 13 and inclined end 23 are then brought down on top of the lower plate 14 and razor blades thereon, and inclined end 24. The inclined ends have openings 29 for a securing bolt 30 passed through the handle adjacent its lower end and these openings, and secured to the handle by the wingnut 31 threaded on this bolt. It will be seen that this one bolt is the entire securing means for attaching the plates and holders 13 and 14 and clamping the razor blades 19 between them, and it is also the means for securing the cutter to the handle 11, so that in replacing or reversing the blades it is only necessary to release the wingnut, separate members 13 and 14, remove and replace or reverse the blades, place the top member 13 back on the member 14, and then replace them on the handle by mere manipulation of this single wingnut. This construction and arrangement also eliminates the use of any projecting elements such as bolts or screws on the cutter 10 which could catch or hold the grass or weeds or the like in the use of the cutter. To prevent turning of the cutter 10 on the handle, the upper corners of the inclined end 23 of the upper plate or holder 13 are bent inwardly at an angle as shown at 32 so that when secured to the handle these bent-in corners rest against the adjacent opposite bevelled edges 12 of the handle and form a very simple and effective means for holding the cutter 10 straight with the handle and prevent its turning relative thereto.

It has been found that the construction and arrangement above described provides a grass and small weed cutter which is simple in construction and reasonable in price and is especially adapted for use in limited spaces among shrubs and bushes, around trees, along walks and driveways, foundations, walls, and the edges of flower-beds, which the lawnmower misses or cannot reach. The use of the old or new razor blades furnishes a keen edge which does not require resharpening, are cheap and easy to obtain, may be quickly replaced, or reversed where the double-edged type is used, if one should be chipped on a stone or other object. It will be further evident that the operation of replacing or reversing these blades is a very simple one, requiring merely that the single wingnut be removed, which will permit opening of the holder for the blades, and either their replacement or reversal, and no tools such as a wrench or the like are required. The folded end 15 not only provides an effective means for holding the free end of the upper or blade-clamping plate 13, but it helps to protect the sharp cutting edges of the razor blades when striking the end of the device against walls and other obstructions. As the blade holder or plates are inclined upwardly toward the cutting edge, as shown in Fig. 3, this not only keeps the cutting edge off the ground by making the rear edge 26 hit first, but it also causes the blade to cut up diagonally through the grass and weed stems, similar to the action of a scythe, instead of straight across them, giving more effective and easier operation. The slope of the handle permits the device to be swung back and forth naturally with the bottom edge of the cutter 10 level with the ground when the rear end of this cutter is about six inches in front of the operator's toes. In this position it swings more naturally, is less tiresome and cuts more efficiently than when the cutter blade is held further away. For the best operation the handle is held in one hand and where there is sufficient room the cutter or blade is swung back and forth somewhat like a pendulum in short, quick strokes. On the back stroke, the lower rear edge of the blade-holding plates or cutter has a tendency to straighten up bent grass so that it may be cut more effectively on the next forward stroke. The device has been found to work many times faster and easier than the usual type of grass shears.

Having thus set forth the nature of my invention, I claim:

A grass and weed cutter comprising a cutter head, said head comprising upper and lower narrow plates including superimposed body portions provided with means for mounting a plurality of safety razor blades provided with longitudinal slots between them with cutting edges projecting forwardly from said plates, the outer end of the lower plate being bent upwardly and over the outer end of the upper plate forming a seat detachably holding this free end of the upper plate, said razor blade securing means including lugs pressed upwardly from the lower plate seated in the slots in the blades and the lower side of the upper plate being provided with recesses into which the outer ends of the lugs project, the inner ends of both plates being inclined upwardly and forwardly from the body portions and superimposed, an elongated handle provided with a substantially flat side at its lower end located against one side of said inclined end portions of the plate, a single bolt passing through the handle and both said inclined end portions securing these end portions together and to the handle, and the corner portions at the free end of one of said inclined portions being inclined inwardly and engaging opposite sides of the handle to retain the cutter head against turning on the bolt.

References Cited in the file of this patent
UNITED STATES PATENTS

| Number | Name | Date |
| --- | --- | --- |
| 406,737 | Johnson | July 9, 1889 |
| 1,683,853 | White | Sept. 11, 1928 |
| 1,800,905 | Rieff | Apr. 14, 1931 |
| 2,070,190 | Wells | Feb. 9, 1937 |
| 2,309,906 | Kelsey | Feb. 2, 1943 |
| 2,431,106 | Brooke | Nov. 18, 1947 |
| 2,508,819 | Flick | May 23, 1950 |